United States Patent
Isani et al.

(10) Patent No.: US 7,502,896 B2
(45) Date of Patent: Mar. 10, 2009

(54) SYSTEM AND METHOD FOR MAINTAINING THE INTEGRITY OF DATA TRANSFERS IN SHARED MEMORY CONFIGURATIONS

(75) Inventors: Soniya T. Isani, UP (IN); Hariharasudhan Kalayamputhur Radhakrishnan, UP (IN)

(73) Assignee: STMicroelectronics Pvt. Ltd., Noida, Uttar Pradesh (IN)

( * ) Notice: Subject to any disclaimer, the term of this patent is extended or adjusted under 35 U.S.C. 154(b) by 223 days.

(21) Appl. No.: 11/449,578

(22) Filed: Jun. 7, 2006

(65) Prior Publication Data
US 2007/0073826 A1    Mar. 29, 2007

(30) Foreign Application Priority Data
Jun. 7, 2005   (IN) .................. 1458/DEL/2005

(51) Int. Cl.
    *G06F 12/00* (2006.01)
(52) U.S. Cl. ........................ 711/151; 711/147
(58) Field of Classification Search ........... 711/151, 711/152, 147
    See application file for complete search history.

(56) References Cited

U.S. PATENT DOCUMENTS

| 4,151,609 A | 4/1979 | Moss |
| 7,246,187 B1* | 7/2007 | Ezra et al. ............ 710/200 |
| 2002/0065994 A1* | 5/2002 | Henson et al. ........... 711/151 |
| 2006/0069882 A1* | 3/2006 | Wheeler et al. ......... 711/151 |

* cited by examiner

*Primary Examiner*—Brian R Peugh
(74) *Attorney, Agent, or Firm*—Lisa K. Jorgensen; Paul F. Rusyn; Graybeal Jackson LLP

(57) ABSTRACT

Embodiments of the instant invention relate to a system for maintaining the integrity of data transfers in shared memory configuration by different processes to a data buffer located in the contiguous memory locations. The accesses by the different processes can be at the same time. One embodiment employs a CISC CPU and a peripheral using a Direct Memory Access (DMA) controller, both of which have an 8-bit data busses. The Memory Interface is provided with a sequencer and registers coupled to a Random Access Memory (RAM). The sequencer controls read and write operations of the RAM and ensures atomic transfer of multiple bytes to the RAM by one process invoking a special mode. This ensures that the other processes either read the old set of data or the new set of data with a minimum delay.

20 Claims, 5 Drawing Sheets

SYSTEM AND METHOD FOR MAINTAINING THE INTEGRITY OF DATA TRANSFERS IN SHARED MEMORY CONFIGURATIONS

PRIORITY CLAIM

This application claims priority from Indian patent application No. 1458/Del/2005, filed Jun. 7, 2005, which is incorporated herein by reference.

TECHNICAL FIELD

The present invention relates in general to a system for maintaining the integrity of data transfers in shared memory configurations.

BACKGROUND

Data sharing is an important phenomenon in the day-to-day systems having a number of peripherals connected to a processor. In order to facilitate transfer of data from one peripheral to another the data is routed via the processor or a memory element. FIG. 1 is a block diagram depicting a system having at least two devices 10 and 11 that share data through a Random Access Memory (RAM) 13. The device 10 can be a slow communication link that uses a Dynamic Memory Access (DMA) Controller 12 while the device 11 can be a typical Complex Instruction Set Computing (CISC) architecture. The device 10 uses the RAM 13 as a means to share data with the device 11, as it has no dedicated First-In First-Out (FIFO) for sharing data.

The first device 10, 11 accessing the RAM 13 may release control of the RAM 13 in between while writing bytes into it. In such a situation, if the second device 11, 10 reads the shared buffer in the RAM 13, it will read the buffer which is partially updated. Hence there is a need for a method to protect the atomicity of such shared data, where the term "atomicity" in this context relates to an operation, which in the present example is the writing of bytes in to a shared buffer in the RAM 13, that must be performed entirely before these bytes are read from the shared buffer. Those skilled in the art will understand the use of the term atomicity in the context of the present invention.

Conventional FIFO memory interfaces are often used to temporarily store data sequentially that is shared between two or more processes, for e.g. a slow communication link and the CPU as shown in FIG. 2. FIFO interfaces are typically employed to accommodate processes that operate asynchronously as described in U.S. Pat. No. 4,151,609.

The communication link 20 transfers data to the CPU 22 using a FIFO buffer 21. To quote an example, a sending process in the communications link 20 writes to the buffer 21, filling the buffer to a particular threshold, and then signals the receiving CPU 22 to read the filled buffer. This significantly increases the waiting time for the processes to read/write if both processes work at different rates. Further, if a process releases the buffer 21 for it to be accessed by any other process before completing the transfer of a set of data, then atomicity of the data is lost as the second process gets access to data that is not updated completely.

Suppose the CPU 22 is processing data, which consists of multiple bytes, it will take approximately 3 to 6 CPU clock cycles per byte (CISC architecture). Hence to write N bytes it requires N*x (x ranging from 3 to 6 depending on the architecture of the CPU) clock cycles. If in the course of this processing, same data is read by an I2C communications link, a peripheral, using a DMA controller then the atomicity of data read will be lost (i.e. it will read some old bytes and some processed bytes). One method of protecting corruption of shared data would be to disable the DMA during the writing of N bytes, which would result in a waiting time of N*x clock cycles for any DMA requests.

Based on the foregoing, a need exists for a capability that provides efficient utilization of a shared buffer with atomicity of data maintained between read/write accesses.

The requirement for an improved architecture is due to the limitations of prior art approaches and the waiting time constraint for processes to access shared memory.

SUMMARY

To obviate the aforesaid drawbacks, an aspect of the instant invention preserves the integrity of data shared between two devices through a memory.

Another aspect of the instant invention is reducing the waiting time for a device to access data. In one aspect of the invention, the waiting time is reduced to (N−1) CPU cycles while atomicity is maintained.

According to one aspect of the instant invention, a system for maintaining the integrity of data transfers in shared memory configuration includes a plurality of devices for reading or writing data, a memory interface connected to the plurality of devices, and a shared memory connected to the memory interface for storing the data.

The memory interface includes arbitration logic for prioritizing the access of the devices to the memory. A control block is connected to the arbitration logic for facilitating the buffering of data while the access of the shared memory is restricted. A plurality of buffers is connected to the control block for temporarily storing data.

According to one aspect of the present invention, the shared memory is a random access memory.

The priority of the plurality of devices is decided by the arbitration logic according to another aspect of the present invention.

A method according to one aspect of the present invention maintains data integrity in memory data transfers in shared memory configurations. The method includes arbitrating the access requests for the data transfers, restricting the access to the shared memory while one device is accessing it, and buffering the data from the restricted device during the restriction period to reduce the waiting time.

A method according to a further aspect of the present invention maintains data integrity in memory data transfers wherein the buffering further includes configuring a byte count register with the number of bytes to be written in the memory atomically, setting a control bit to enter multi byte control mode writing the data sequentially into an intermediate buffer, and writing the last byte of the data directly to the memory and simultaneously transferring the data from the intermediate buffer to the memory.

BRIEF DESCRIPTION OF THE DRAWINGS

Embodiments of the invention will now be described with reference to the accompanying drawings as follows.

DETAILED DESCRIPTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of the present invention relate to a mode by which a set of data can be transferred atomically to a RAM. Since many processes can access this set of data, the mode ensures minimum waiting time for other processes, such that a second process will either receive old data or new data depending on the priorities between the processes.

The proposed architecture has been designed for an 8-bit CISC micro controller (ST7 family of micro controllers), which shares the same RAM as an I2C communication link. The I2C communications link or peripheral uses a DMA controller for memory transfer between its shift register and the RAM. However, the scope of the invention is not limited to the same. Embodiments of the invention can be extended to all the devices where data sharing is required between two processes while maintaining data atomicity.

Figure 1:
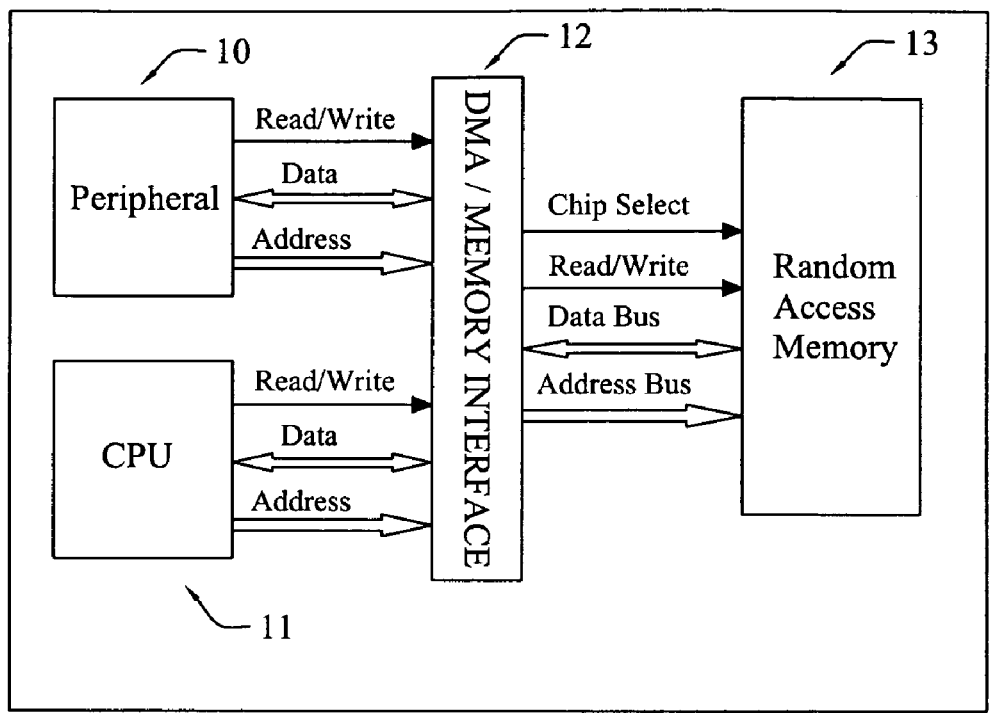
FIG. 1 shows the block diagram of the prior art.
Figure 2:
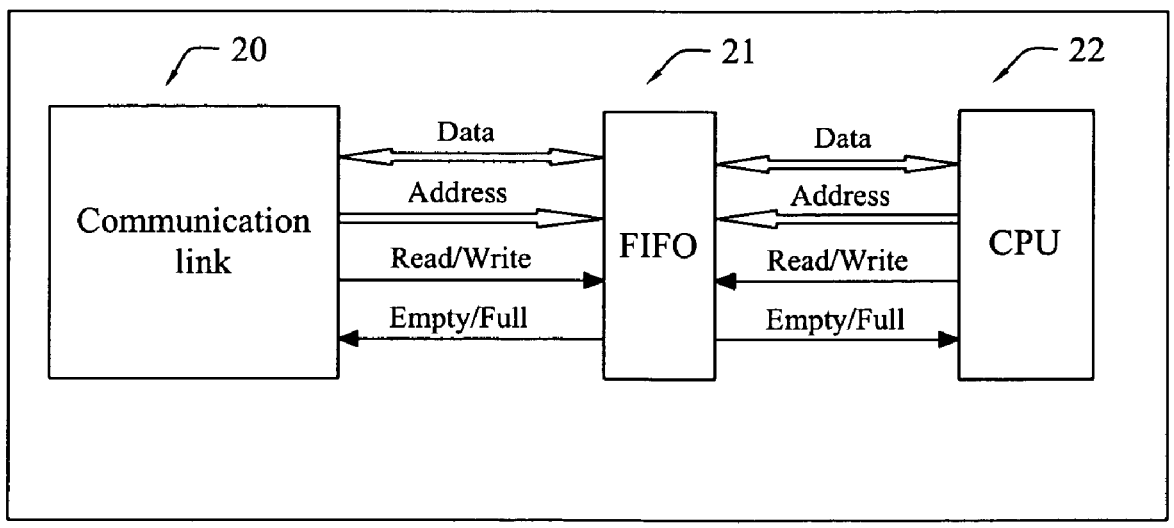
FIG. 2 shows the diagram analogous to that of U.S. Pat. No. 4,151,609.
Figure 3:
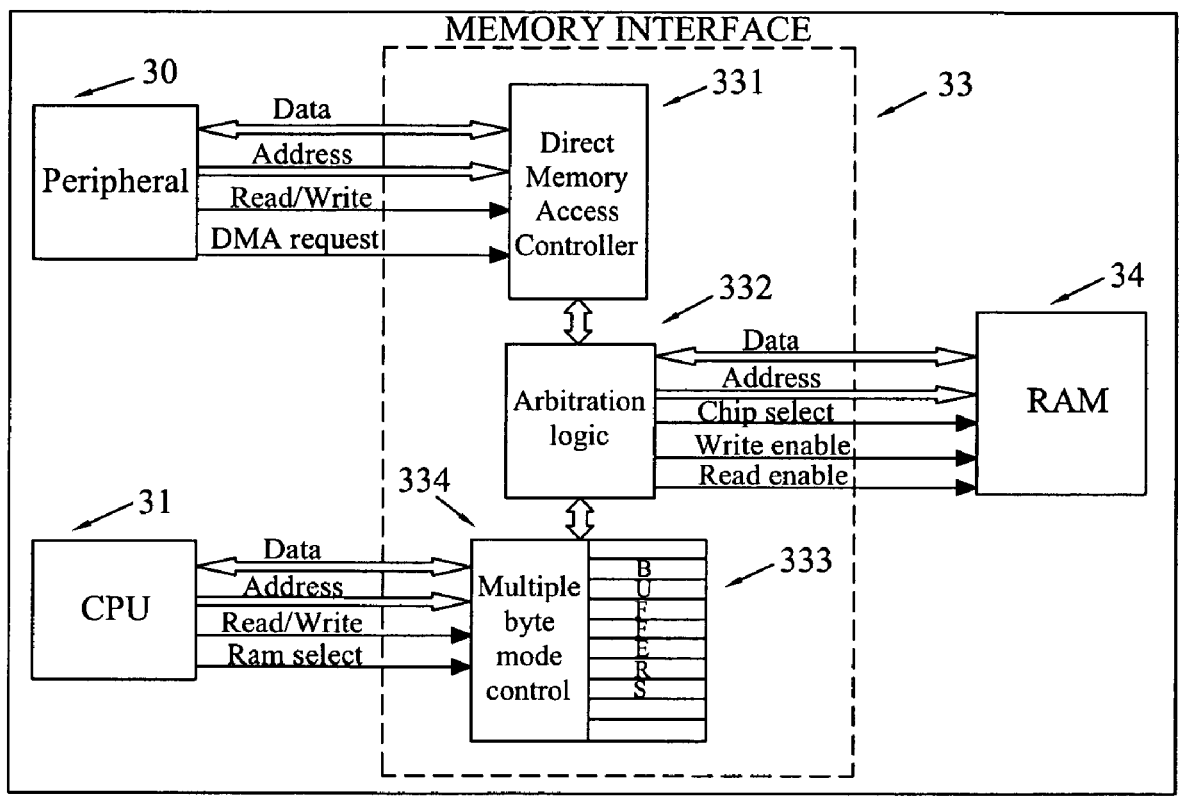
FIG. 3 shows an architecture in accordance with one embodiment of the invention.

FIG. 3 shows the architecture employed in one embodiment of the invention. It comprises of a peripheral device 30, a processor 31, a Memory Interface 33 and a RAM 34. The Memory Interface 33 consists of a DMA Controller 331 for accessing the Random Access Memory 34. The CPU 31 accesses the RAM 34 through multiple byte control logic 334 which utilizes buffers 333 when the multiple byte mode is set. The arbitration between DMA Controller 331 and CPU 31 access is done in the arbitration logic 332. Arbitration logic 332 is utilized to ensure that the DMA Controller 331 is given highest priority over the CPU 31 access except when the CPU 31 enters the "multiple byte mode" and the buffered data is being transferred to RAM 34. When transferring the data in multi-byte mode, DMA 331 directly writes RAM 34 while the control logic 334 updates RAM 34 with the data from buffers 333.

In order to avoid the peripheral 30 from receiving corrupted data, a special mode is created for the CPU 31. Before entering this mode, the CPU 31 needs to program a byte count register with the number of bytes that need to be written to the RAM 34 atomically. To enter this mode, the CPU 31 sets a control bit in the memory interface 33. Once this mode is entered, all the bytes are sequentially written to intermediate buffers 333 before writing into the RAM 34. First N−1 bytes are written in the intermediate buffers, then the last byte is written directly to RAM 34. Simultaneously N−1 bytes are transferred from the intermediate buffers 333 to RAM 34. If N bytes are transferred to RAM 34, then the DMA controller 331 will have a waiting time of (N−1) clock cycles, after which the CPU 31 has finished its access of the RAM 34.

The DMA controller 331 in turn should also read such data atomically, that is in a burst mode. Thus a set of data will become atomic when written by one process and also when read by another process.

The theory underlying this embodiment of the invention is as follows.

When the CPU 31 writes bytes in the multiple byte mode, the bytes are not written to the RAM 34 but to buffers 333 in the memory interface 33. The start address is also stored which is the address of the first byte on the address bus.

After the desired byte count (N−1) is reached, the memory interface 33 transfers all the buffered bytes to the RAM 34 in continuous clock cycles, the first byte at the buffered address and the subsequent bytes sequentially.

The above may be achieved with the help of a state machine, which gets activated as soon as the multiple bytes control bit is set.

Figure 4:
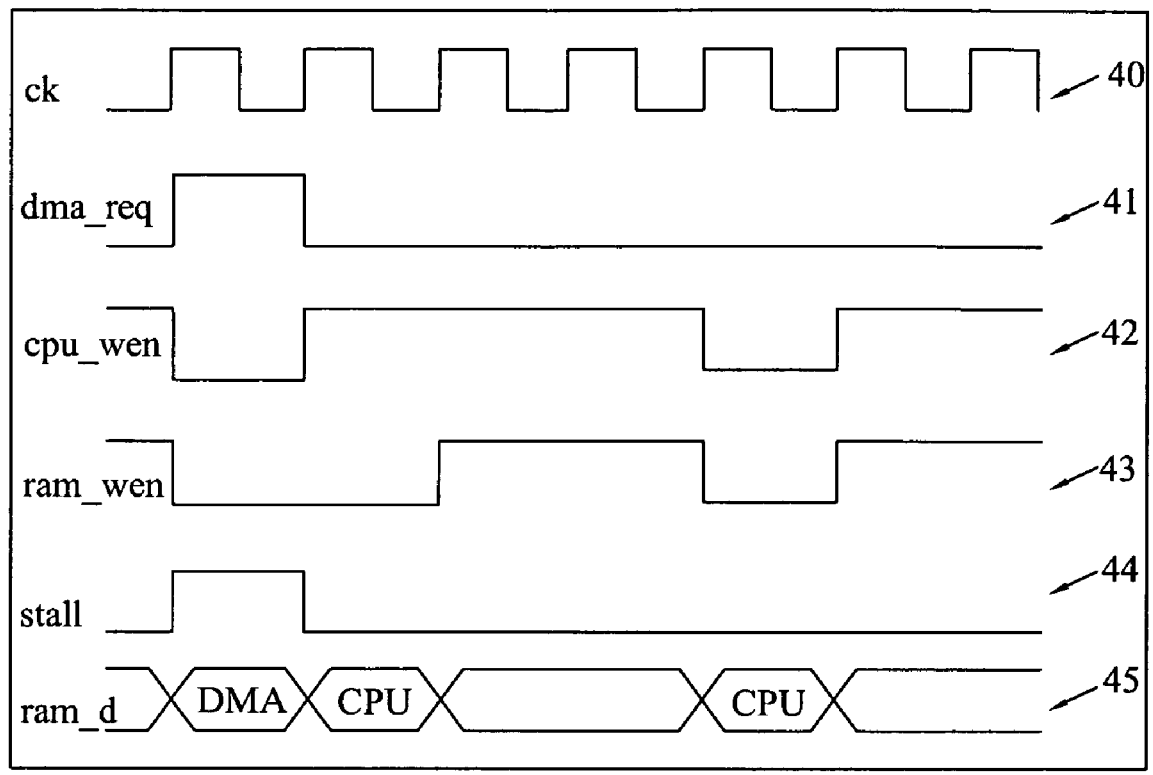
FIG. 4 shows is a signal timing diagram illustrating the operation of the DMA Controller of FIG. 3 according to one embodiment of the present invention.

FIG. 4 is a signal timing diagram showing the operation of the Direct Memory Access DMA Controller 331 according to one embodiment of the present invention. Whenever the DMA Controller 331 needs to access the RAM 34 it checks whether the CPU 31 is accessing the RAM 34. If the CPU 31 is accessing the RAM 34, then it stalls the CPU 31 (freezes the CPU state) using a stall signal 44 (specific to ST7 microcontroller). A signal 40 is the clock at which the CPU 31 and the DMA controller 331 work. A signal 41 is the DMA request for a memory transfer and a signal 42 is a memory write enable signal from the CPU 31. When a DMA request 41 is made, the stall signal 44 is asserted which freezes the CPU 31 and the DMA controller 331 accesses the RAM 34. Therefore, the CPU 31 write operation takes place in the next cycle as by signals 45 in FIG. 4. A write enable signal '43' of the RAM 34 is manipulated by the controller 331 accordingly.

Figure 5:
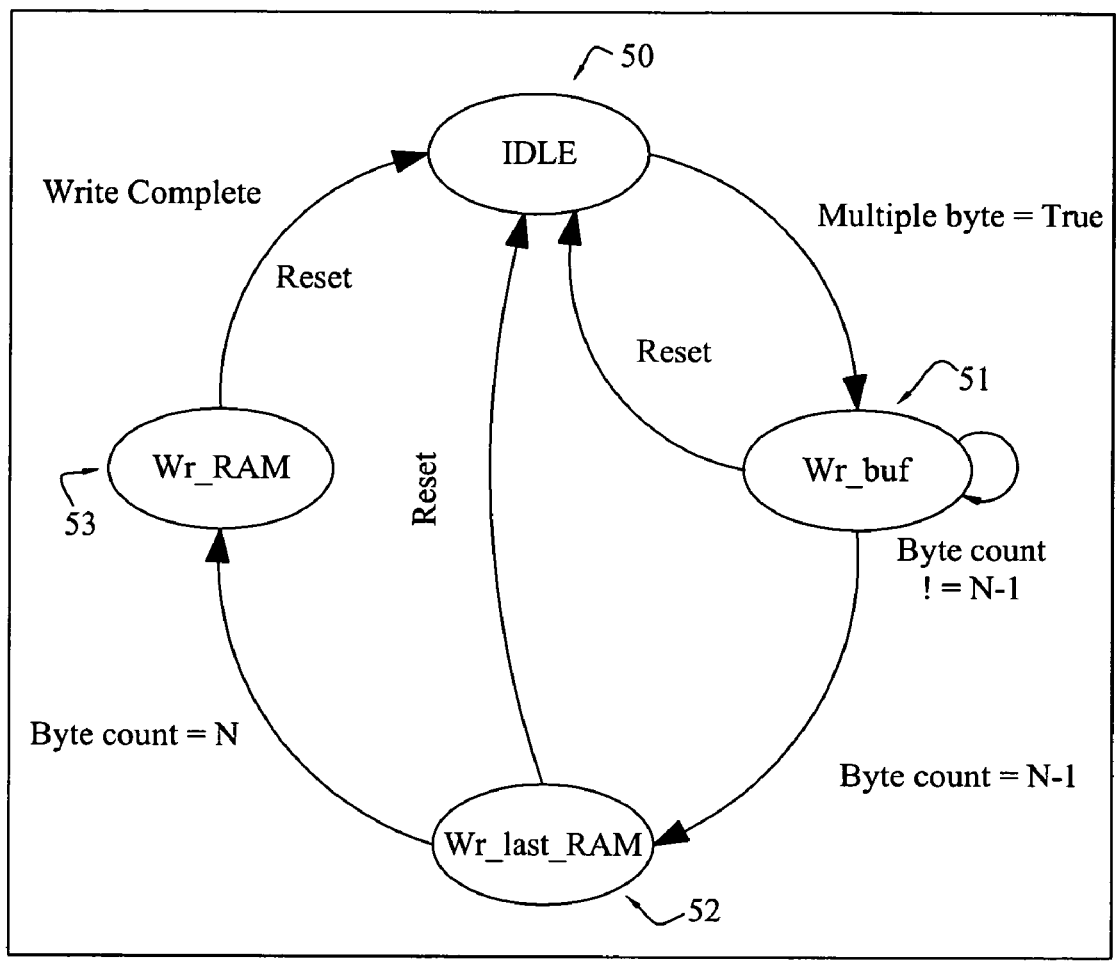
FIG. 5 shows a state machine used in multiple byte mode of the architecture of FIG. 3 according to one embodiment of the present invention.

The "multiple byte mode" logic of FIG. 3 may be realized using a simple state machine as shown in FIG. 5. When the state machine is not active, it is in default state 'IDLE' 50. It gets activated on setting a control bit "multiple byte mode" in the memory interface 33. Once this bit is set, the memory interface 33 collects bytes from the process that has set this bit e.g. CPU 31; in 'Wr_buf' 51 state. The number of bytes to be written in the buffers 333 is configured in a configurable byte count register, which can be written only when the multiple byte mode bit is not set. These bytes are written and stored in buffers 333 along with the address of the first byte. In the case of another process having higher priority making a request, the current operation is aborted and control goes to state 50.

When a byte counter reaches the value N−1, the nth byte is written directly to the RAM 34 in the 'Wr_last_RAM' 52 state. Once the last byte is written to the RAM 34, the remaining (N−1) bytes are written sequentially into the RAM in the 'Wr_RAM' 53 state, during which any other access to the RAM is not allowed i.e. any DMA is not entertained.

Once all the buffer 333 contents are transferred to the RAM 34, the multiple byte mode control bit is reset by hardware and all DMA controller 331 operations are enabled; the state machine returns to IDLE state 50.

Figure 6:
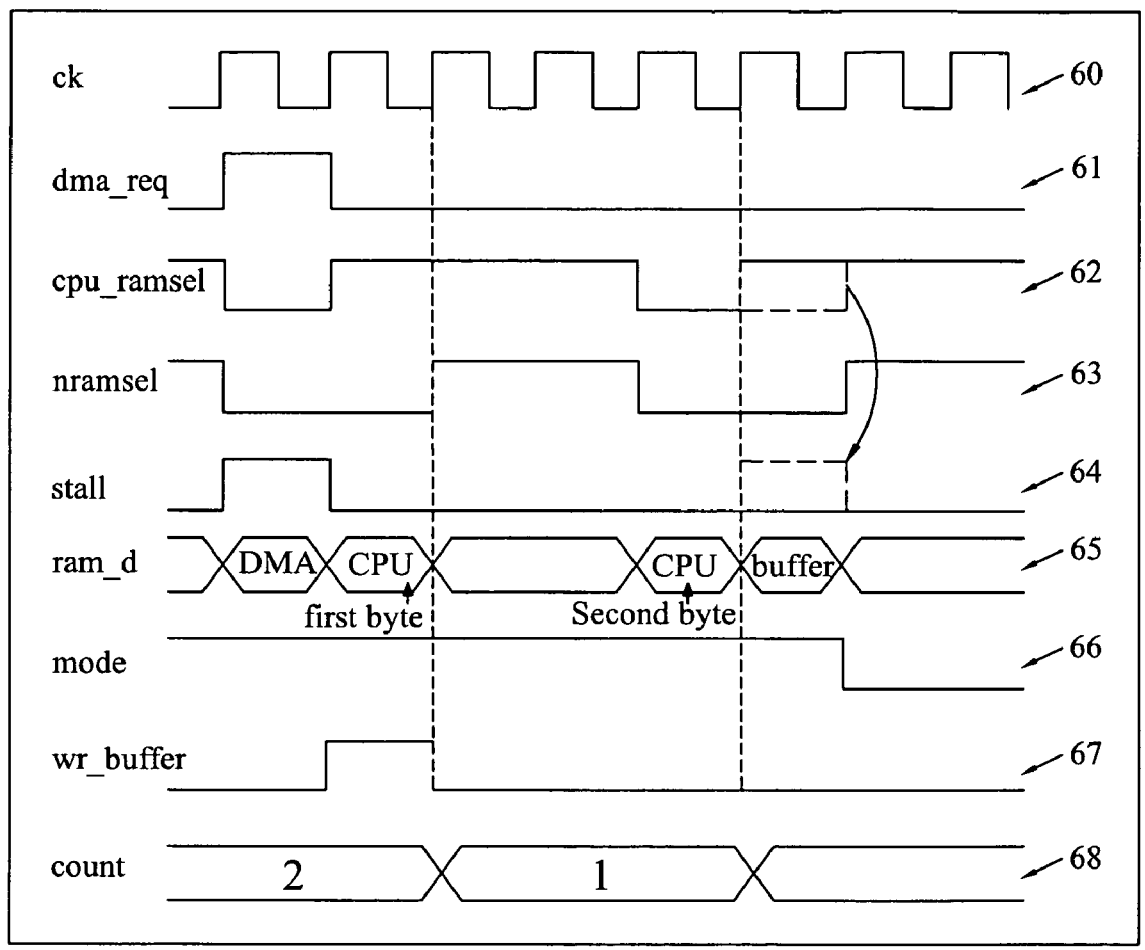
FIG. 6 is a signal timing diagram illustrating operation of the architecture of FIG. 3 according to one embodiment of the present invention.

This embodiment of invention is explained with the help of an example. Suppose in an application the I2C peripheral 30 receives data, which is logical 2 bytes. First byte is received at a time while other byte is transferred to the RAM 34 using DMA Controller 331. The CPU 31 also processes this 16 bit data, 8 bits at a time. There could be a situation where the I2C peripheral 30 reads the processed bytes in between the two writes of the CPU (spread over 3 to 6 CPU cycles) which would result in the I2C peripheral getting a partially processed data. Referring to FIG. 6, using the current invention, for data, which consists of more than one byte, the CPU 31, working on clock ck 60, can enter the multiple byte mode after configuring the byte count register to 02H.

Once the multiple mode bit 66 is set, every write 67 into the buffer 333 decrements the byte count 68. In the example (N-1)$^{th}$ byte, i.e. first byte will be written in the data buffer 333 and its address into the address buffer in the memory interface 33. The second byte will be written directly to the RAM 34 as seen in signal 65. If the CPU 31 tries to access the RAM 34 during this cycle as shown by the dotted part of 62 then it is stalled as indicated by signal 64. In the next immediate cycle the interface 33 will transfer the buffered byte to the buffered address. During this cycle all DMA controller 331 accesses 61 will be disabled, hence I2C peripheral 30 will either read old data or completely processed data. The memory interface 33 manipulates the RAM 34 chip select signal 63 accordingly. Thus atomicity of multiple bytes is maintained.

Embodiments of this invention thus describe a method with the system for an optimal access time while maintaining the atomicity of access for the processes. To achieve the optimal access time, the data to be written is first written in an intermediate buffer (typically by the slow process) before it is updated in the memory.

Embodiments of the present invention may be used in any type of electronic systems where a multiple devices share or transfer data among one another through a shared memory, such as in computer systems, cellular phones, personal digital assistances, and so on.

From the foregoing it will be appreciated that, although specific embodiments of the invention have been described herein for purposes of illustration, various modifications may be made without deviating from the spirit and scope of the invention.

We claim:

1. A system for maintaining the integrity of data transfers in shared memory configuration comprising:
   a plurality of devices for reading or writing data;
   a memory interface connected to said plurality of devices; and
   a shared memory connected to said memory interface for storing said data;
   wherein said memory interface comprises:
      an arbitration logic for prioritizing the access of said plurality of devices to said shared memory;
      a control block connected to said arbitration logic for facilitating the buffering of data while the access of said shared memory is restricted; and
      a plurality of buffers connected to said control block for temporarily storing data
   wherein the memory interface is operable in a multi-portion mode responsive to a control signal from at least one of the plurality of devices, the memory interface
      operable during the multi-portion mode to sequentially buffer in the plurality of buffers N-1 portions of a block of data to be transferred from one of a plurality of devices to the shared memory, the block of data including N portions, and
      after buffering the N-1 portions, the memory interface being further operable to transfer the Nth portion directly into the shared memory and to thereafter transfer the N-1 portions to the shared memory.

2. A system as claimed in claim 1 wherein said shared memory is a random access memory.

3. A system as claimed in claim 1 wherein the priority of said plurality of devices is decided by said arbitration logic.

4. A method for maintaining data integrity in memory data transfers in shared memory configuration comprising the steps of:
   arbitrating the access requests for said memory data transfers;
   restricting the access to said shared memory while one device is accessing it; and
   buffering the data from the restricted device during the restriction period to reduce the waiting time, wherein the buffering includes sequentially buffering N-1 portions of a block of data to be transferred to the shared memory, the block of data including N portions, and
   after buffering the N-1 portions, transferring the Nth portion directly into the shared memory and to thereafter transfer the N-1 portions to the shared memory.

5. A method for maintaining data integrity in memory data transfers as claimed in claim 4 wherein said buffering further comprises the steps of:
   configuring a byte count register with the number of bytes to be written in the memory atomically;
   setting a control bit to enter multi byte control mode;
   writing the data sequentially into an intermediate buffer; and
   writing the last byte of said data directly to said memory and simultaneously transferring said data from said intermediate buffer to said memory.

6. A system for transferring data among devices, the system comprising:
   a shared memory operable to store data;
   a plurality of devices, each device operable to transfer data to and from the shared memory; and
   a memory interface coupled to at least some of the plurality of devices and to the shared memory, the memory interface operable in a multi-portion mode responsive to a control signal from at least one of the plurality of devices, and during the multi-portion mode the memory interface operable to sequentially buffer N-1 portions of a block of data to be transferred from one of the plurality of devices to the shared memory, the block of data including N portions and the memory interface further operable, after buffering the N-1 portions, to transfer the Nth portion directly into the shared memory and to thereafter transfer the N-1 portions to the shared memory.

7. The system of claim 6 wherein each portion of the block of data comprises a byte along with a corresponding address for that byte.

8. The system of claim 6 wherein the shared memory stores a first version of the block of data being buffered in the memory interface, with the version of the block of data being buffered being termed a second version, and wherein the memory interface is further operable to provide the first version to the plurality of devices attempting to access the block of data prior to the second version being stored in the shared memory.

9. The system of claim 6 wherein the memory interface further comprises a portion-count register that stores a portion count indicating the number of portions in the block of data, and wherein the memory interface decrements the portion count after each portion is buffered in the memory interface until the portion count equals N-1, at which point the memory interface transfers the Nth portion directly to the shared memory.

10. The system of claim 6 wherein the shared memory comprises a random access memory (RAM).

11. The system of claim 6 wherein at least one of the plurality of devices comprises a processor and at least one of the plurality of devices comprises a communications link.

12. The system of claim 6 wherein the control signal comprises a control bit in the memory interface, with one of the plurality of devices setting the control bit to place the memory interface in the multi-portion mode of operation.

13. The system of claim 6 wherein the memory interface comprises:
a plurality of storage buffers operable to store the portions of the block of data being buffered; and
multiple byte control logic coupled to the plurality of storage buffers, the multiple byte control logic operable to control the storing of portions of a block in the plurality of buffers;
arbitration logic coupled to the multiple byte storage logic and operable to prioritize the access of each device to the shared memory and to restrict access to a block of data in the shared memory when a more recent version of this block is being transferred into the shared memory from the plurality of storage buffers.

14. An electronic system, comprising:
electronic circuitry including a system for transferring data among devices, the system including,
a shared memory operable to store data;
a plurality of devices, each device operable to transfer data to and from the shared memory; and
a memory interface coupled to a plurality of devices and to the shared memory, the memory interface operable in a multi-portion mode responsive to a control signal from at least one of a plurality of devices, and during the multi-portion mode the memory interface operable to sequentially buffer N−1 portions of a block of data to be transferred from one of a plurality of devices to the shared memory, the block of data including N portions and the memory interface further operable, after buffering the N−1 portions, to transfer the Nth portion directly into the shared memory and to thereafter transfer the N−1 portions to the shared memory.

15. The electronic system of claim 14 wherein the electronic circuitry comprises one of computer system, cellular telephone, and personal digital assistant circuitry.

16. A method for maintaining data integrity in a shared memory, comprising:
arbitrating access requests for data transfers to and from the memory;
restricting a second access to the shared memory while a first access to the shared memory is ongoing;
storing data corresponding to the second access while the first access is ongoing, wherein storing data includes sequentially buffering N−1 portions of a block of data; and
transferring the block of stored data into the shared memory via the second access once the first access is complete, the block of data including N portions and the operation of transferring including, after buffering the N−1 portions, transferring the Nth portion directly into the shared memory and thereafter transfering the N−1 portions to the shared memory.

17. The method of claim 16 wherein storing data comprises sequentially storing portions of the data.

18. The method of claim 17 wherein each portion comprises a byte.

19. The method of claim 17 wherein transferring comprises transferring a last portion of the data directly into the shared memory without buffering this last portion.

20. The method of claim 16 wherein the operation of restricting is performed responsive to a control bit being set.

* * * * *